United States Patent [19]

Mackie

[11] Patent Number: 5,408,187

[45] Date of Patent: Apr. 18, 1995

[54] ELECTRICAL FAULT INDICATOR UTILIZING A LIQUID CRYSTAL POLYMER GEL DISPERSION EXHIBITING TWO STABLE CONTRASTING OPTICAL STATES AT ZERO FIELD

[76] Inventor: Alexander S. Mackie, 3 Arbordell Road, Etobicoke, Ontario, Canada, M9W 4C6

[21] Appl. No.: 32,277

[22] Filed: Mar. 17, 1993

[51] Int. Cl.⁶ .................. G01R 31/02; G02F 1/1333; G02F 1/1345; G08B 21/00
[52] U.S. Cl. ................... 324/555; 324/550; 324/133; 307/400; 340/815.55; 359/51; 359/105
[58] Field of Search ............ 324/537, 555, 556, 550, 324/133; 307/400; 359/105, 88, 85, 51; 361/271; 340/815.55; 345/87, 50, 38

[56] References Cited

U.S. PATENT DOCUMENTS

| | | | |
|---|---|---|---|
| 3,578,844 | 5/1971 | Churchill et al. | 359/51 X |
| 3,585,381 | 6/1971 | Hodson et al. | 359/51 X |
| 3,600,060 | 8/1971 | Churchill et al. | 359/51 X |
| 4,447,132 | 5/1984 | de Zwart | 359/105 X |
| 4,673,928 | 6/1987 | Guim | 340/638 |

FOREIGN PATENT DOCUMENTS

| | | |
|---|---|---|
| 0226530 | 6/1987 | European Pat. Off. . |
| 3308972 | 9/1983 | Germany . |
| 60-026319 | 2/1985 | Japan . |
| 63-032519 | 2/1988 | Japan . |
| WO8800719 | 1/1988 | WIPO . |
| WO9219695 | 11/1992 | WIPO . |

OTHER PUBLICATIONS

Yang et al., "Cholesteric Liquid Crystal/Polymer Gel Dispersion Bistable at Zero Field", Proceeding of the IEEE, Aug. 1991, pp. 49–51.

Yang et al., "Cholesteric Liquid Crystal/Polymer Gel Dispersion: Reflective Display Application", Conference Board Internal Display Research Conference (SID), Oct. 1991.

Doane et al, "Front-Lit Flat Panel Display from Polymer Stabilized Cholesteric Textures", The Twelve International Display Research Conference, Oct. 1992.

Primary Examiner—Gerard R. Strecker
Assistant Examiner—Diep Do

[57] ABSTRACT

A polymer stabilized cholesteric textures wafer is sandwiched between two electrode plates, one of which is transparent. Terminals are provided for connection in parallel with a circuit protection device of an AC circuit. If the circuit protection device opens circuits, AC is supplied to the electrodes across the polymer wafer. This drives the wafer to a reflecting state wherein it is coloured. This reflecting state may be viewed by an observer through the transparent electrode.

9 Claims, 4 Drawing Sheets

ELECTRICAL FAULT INDICATOR UTILIZING A LIQUID CRYSTAL POLYMER GEL DISPERSION EXHIBITING TWO STABLE CONTRASTING OPTICAL STATES AT ZERO FIELD

BACKGROUND OF THE INVENTION

1. Field of the Invention

This invention relates to an electrical fault indicator for an AC circuit.

2. Description of the Related Art

A number of types of switching devices (which includes electrical fuses), exist to provide circuit protection in case of an electrical fault. The devices are normally closed single pole, single throw, and in an overload condition open the circuit. Well-known examples are fuses and circuit breakers. A fuse may be of the cartridge type or of the screw plug type. A screw plug fuse has a visible conductive band which, in the case of an overcurrent, overheats and melts away thereby opening the circuit. The narrow band is visible under glass cover, however, due to its small size and in the low light environment in which the fuse is often found, it is often difficult to ascertain whether a particular screw plug fuse has indeed blown. Cartridge fuses are even more problematic as there is generally no external indication that the fuse has blown. Frequently, the only way to determine whether a cartridge type fuse is blown is to replace the fuse.

Accordingly, there remains a need for a quick and reliable way of determining whether a circuit protection device has open-circuited.

SUMMARY OF THE INVENTION

According to the present invention, there is provided an electrical fault indicator for application in an AC circuit. It comprises the following: a wafer of a liquid crystal material known as polymer stabilized cholesteric textures, (P.S.C.T.); said wafer having two faces; a first conducting electrode having a portion substantially covering one face of said polymer wafer; a second conducting electrode having a transparent portion substantially covering the other of said two faces of said polymer wafer; terminal means for connecting said first and second electrodes in parallel with a normally closed circuit overload protection device in said AC circuit, so that an AC voltage applied across said overload protection device is applied across said polymer wafer through said terminal means by said first and second electrodes.

DESCRIPTION OF THE PREFERRED EMBODIMENTS

Polymer stabilized cholesteric textures (P.S.C.T.) is a cholesteric liquid crystal polymer gel dispersion with interesting properties. The material can be transformed into three textures by application of an appropriate electric field. Two of the textures are stable at zero electrical field. The first stable texture is called the focal-conic texture. When the polymer has this texture it scatters impinging light. Therefore when there is an electrode on a wafer of P.S.C.T. which is coated to absorb light the P.S.C.T. when in the focal-conic texture appears black. The second stable texture is the planar texture. This texture is reflective and when the polymer exhibits this texture, it is green in color. Polarizers are not required.

If a P.S.C.T. is in the focal-conic (scattering) state, it may be driven to the planar (reflective) state with an appropriate voltage excitation. A voltage pulse that exceeds a certain threshold level for a threshold time intervals will cause this result. In the present state of P.S.C.T. development the threshold voltage level is on the order of 60 V and the threshold time interval for the pulse is on the order of a 10 ms. The response time of the P.S.C.T. to produce a texture transformation from focal-conic to planar is in the order of 100 to 300 milliseconds.

A P.S.C.T. in the planar texture may be driven back to the scattering state by applying a voltage pulse having a threshold value which is above a certain minimum value and below the threshold value for driving the polymer into the planar texture. In the present state of P.S.C.T. development the minimum voltage level is on the order of 30 V and the maximum voltage level is on the order of 50 V. The threshold time interval for the pulse is on the order of a 10 ms. The response time of the P.S.C.T. to produce a texture transformation from planar to focal conic is only about 1 millisecond.

If the width of a pulse is much less than 10 ms, the polymer will not be driven all the way from the planar to the focal-conic state or from the focal-conic to the planar state. Instead, the polymer will enter a grey-scale texture which is partly reflective and partly scattering.

A pulse of either polarity will drive the polymer. Further, a P.S.C.T. wafer may be driven by a sinusoidal AC waveform even where each half cycle is be less than 10 ms in width provided the average voltage of the waveform is of a sufficient magnitude.

Figure 1:
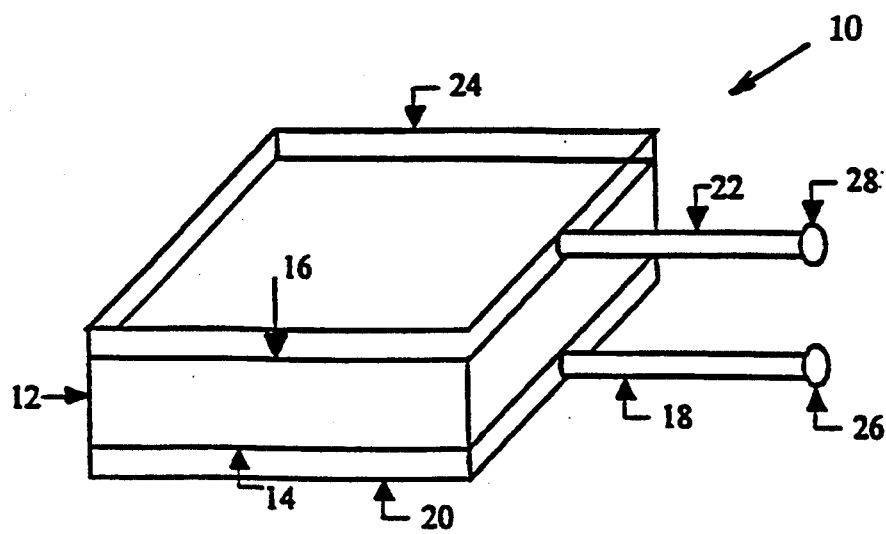
FIG. 1 is perspective view of an electrical fault indicator made in accordance with this invention.

Turning to FIG. 1, an electrical fault indicator 10 for an AC circuit comprises a wafer 12 of polymer stabilized cholesteric textures. The wafer has two faces 14 and 16. A first conducting electrode 18 has a transparent plate-like portion 20 substantially covering face 14 of polymer wafer 12. Portion 20 has its outside face painted black. A second conducting electrode 22 has a transparent plate-like portion, 24, substantially covering face 16 of polymer wafer 12. Terminals 26 and 28 are provided for connection to an AC circuit.

If an excitation of a 60 Hz sine wave is applied across terminals 26, 28 and the excitation has an average voltage amplitude greater than the threshold required to drive the P.S.C.T. into the reflective state, then the P.S.C.T. material is caused to display a green colour.

Unless the P.S.C.T. is addressed by an AC voltage having a magnitude and duration which would drive the cell into a scattering state, the green reflection is displayed indefinitely without further field excitation being applied.

If fault indicator 10, of FIG. 1 is placed in parallel with a fuse or other circuit protection device in an AC circuit, then an open circuit at the contacts of the device permits the AC system voltage to be applied to the indicator P.S.C.T. wafer 12. If the polymer is initialised in one of its two stable textures, the AC voltage, when applied to the polymer, will switch the polymer to its other stable texture provided the magnitude of the voltage is appropriate.

Figure 2:
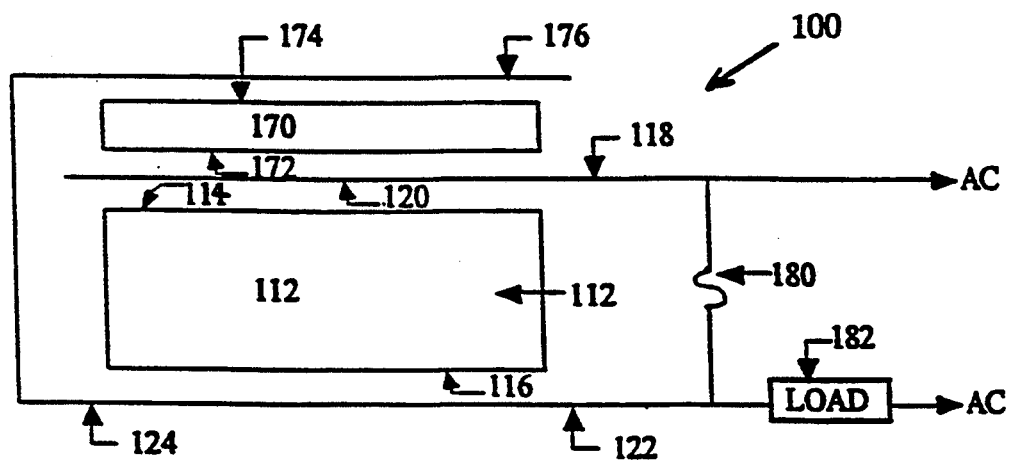
FIG. 2 is a schematic view of an electrical fault indicator made in accordance with another aspect of this invention shown in circuit.

Turning to FIG. 2, an electric fault indicator 100 comprises a polymer wafer 112 sandwiched between plates 120 and 124 of electrodes 118 and 122, respectively. Plate 124 is transparent; plate 120 may be transparent and painted black or it may be opaque with its surface adjacent the polymer wafer 112 painted with a light absorbing coating. Fault indicator 100 includes an electret wafer 170. As will be understood by those skilled in the art, an electret is a permanently polarized dielectric and therefore produces an electric field. The induced voltage amplitude resulting from this field may be chosen over a wide range of appropriate design. It is also important to note that when this induced field collapses its induction will be reversed (Lenz's Law), thus driving the flux internally and depolarizing the electret. The electret wafer has two faces 172 and 174 and is polarized from face-to-face. The plate 120 of the electrode 118 is sandwiched between face 114 of the polymer wafer and face 172 of the electret wafer 170. Electrode 122 has an extension 176 from plate 124 which covers face 174 of the electret wafer. The fault indicator 100 is shown connected in parallel with fuse 180 of an AC network comprising load 182.

The electret wafer 170 of fault indicator 100 is a permanently polarized polymeric wafer which is actuated so that during positive half cycles of AC it remains polarized but during negative pulses of AC its field collapses. The electric field of the wafer induces a voltage across the polymer wafer 112 and this is applied the instant a negative half cycle is completed.

If the AC wave of the network has a voltage amplitude much greater than the threshold voltage required to transform the P.S.C.T. into the planar texture (reflective state), the polymer is transformed into a homotropic texture (which is the third possible texture of a P.S.C.T.) during the pulse, but relaxes back to the planar texture after the pulse.

Figure 3:
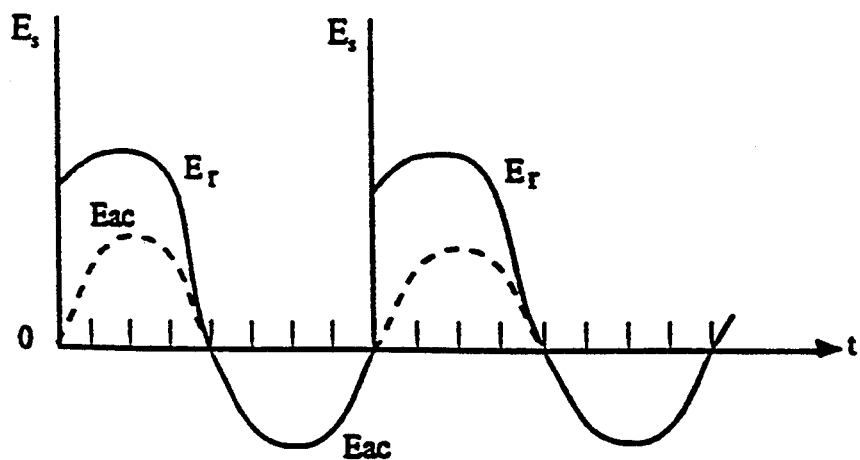
FIG. 3 is a time versus voltage diagram relevant to the operation of the device of FIG. 2.

If fuse 180 blows, AC from the network is applied to fault indicator 100 at terminals 118 and 122. At the start of each positive going alternation, an induction of electrostatic voltage is instantly applied across wafer 112 prior to the rise of the 60 Hz AC waveform. This abruptly applied voltage is of a selected magnitude and at the same time contributes a steep slope at the leading edge of the distorted 60 Hz waveform. Thus, each positive voltage alternation is initiated by the statically induced voltage of the electret an instant before the 60 Hz voltage has reached a meaningful amplitude. FIG. 3 shows the distorted 60 Hz waveform (Er) as well as the statically induced voltage (Es) and the sinusoidal waveform of the network (Eac). If the switching device opens, the full AC voltage applied to wafer 112 combines to modulate the static induction after the initiating "kick-start" statically induced voltage has been applied.

The field excitation voltage across polymer wafer 112 is that applied to plates 120 and 124. It will be noted that the distorted waveform (Er) of FIG. 3 has two differing amplitudes of AC voltage.

The operation of fault indicator 100 is now described in conjunction with the waveform shown in FIG. 3. With protective device 180 closed, polarized wafer 170 electrostatically induces its voltage and this is applied across polymer wafer 112. The fault indicator is connected in parallel with switching device 180, and if these contacts of device 180 open, the full AC voltage is applied together with the statically applied voltage across wafer 112. By way of timing relationships between statically and dynamically applied voltages, the resultant voltage is the distorted sine wave across polymer wafer 112 at plates 120 and 124, represented by Er in FIG. 3. The steep leading edge of the waveform is due to pre-positioned induction voltage appearing at the start of every positive going alternation. As a result, positive alternations are caused to be of higher voltage amplitude than negative alternations of AC applied to electrodes 122 and 118. It is the primary purpose of the fault indicator to display a transition in colour if an electrical overload is detected; a perceptible colour contrast, black to bright green is obtained. However, the peculiar properties of P.S.C.T. material can be further exploited to produce an alternate flashing of colours by the application of voltage amplitudes suitable to switch from scattering to reflective or reflective to scattering states at a perceptible switching rate. The first requirement is that of obtaining two specific amplitudes of voltage needed to drive the P.S.C.T. cell. The circuit of fault indicator 100 meets this need. However, switching at 60 hz is not humanly perceptible. Nevertheless, it may be perceptible by a sensor monitoring the fuse. Alternatively, a frequency divider may be employed; this possibility is further discussed hereinafter. Another problem with attempting to switch at 60 hz is that it is currently beyond the speed of the response time of the P.S.C.T. However, it is believed that this technological limitation will disappear with time.

Figure 4:
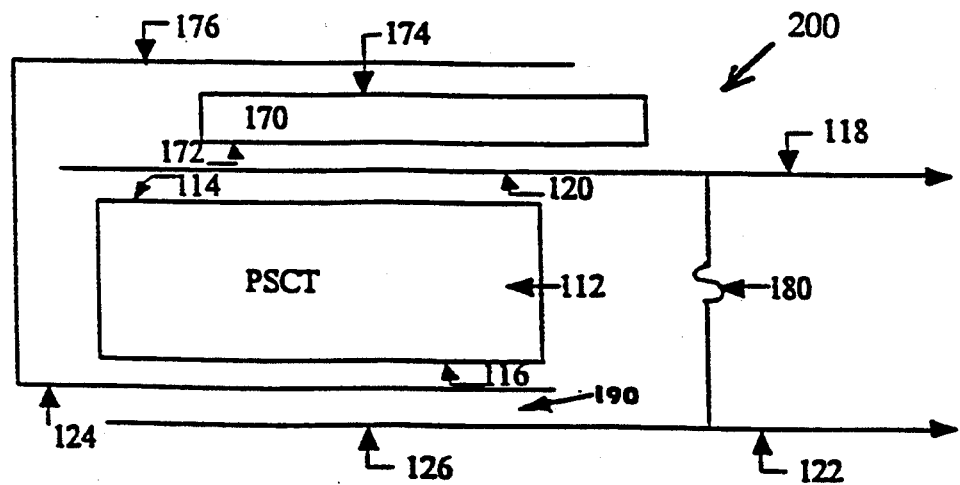
FIG. 4 is a schematic view of an electrical fault indicator made in accordance with a further aspect of this invention.

Another embodiment of an electric fault indicator made in accordance with this invention is shown in FIG. 4. Turning to FIG. 4 wherein like parts have been given like reference numerals, electric fault indicator 200 is modified by the simple expedient of changing the method of coupling to the AC supply. Extension 176 is again taken from plate 124, however, another electrode, transparent plate 126, has been added and is closely coupled to plate 124 to form blocking capacitor 190. Plate 126 is connected to the AC supply by electrode 122 to complete the modification. Electric fault indicator 200 provides increased protection against voltage breakdown and flashover. Otherwise fault indicator 200 operates in the same manner of fault indicator 100 of FIG. 2.

Due to capacitance 190 an additional feature peculiar to fault indicator 200 is worthy of mention. With protective device 180 closed, AC excitation cannot be applied to stimulate wafer 112. Capacitor 190 is connected to plate 120 by way of plate 126, electrode 122, protective device 180 and electrode 118. Charge given to plate 120 by electrostatic induction is distributed to plate 126. An opposite charge appears on plate 124. Charge equilibrium is established at the electrostatic circuit by extension 176. The charge held by capacitor 190 is released when device 180 opens its contacts and will be applied to wafer 112. This effect can generally be ignored. Also, the only time capacitor 190 functions in this way is when device 180 opens its contacts; thereafter the capacitor acts as a blocking capacitor in series with the AC voltage applied to electrodes 118 and 122.

Figure 5:
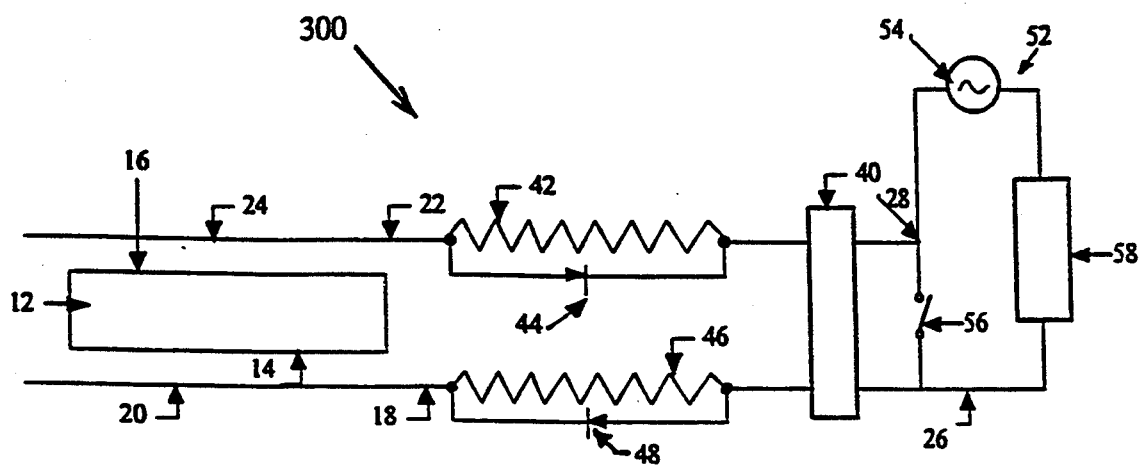
FIG. 5 is a schematic view of an electrical fault indicator made in accordance with a still further aspect of this invention shown in circuit.

A schematic view of another embodiment of an electrical fault indicator made in accordance with this invention, is shown in the circuit of FIG. 5; it is designated electrical fault indicator 300. A parallel connected resistor 42 and diode 44 are interposed between frequency divider 40 and the wafer 12 on electrode 22; a parallel connected resistor 46 and diode 48 are interposed between divider 40 and the wafer on electrode 18. Terminals 28 and 26 are shown connected to an AC circuit 52 comprising an AC source 54 generating a 60 Hz sine wave. A single pole circuit breaker 56 shunts electrical fault indicator 300 while load 58 completes the power system supply circuit. In order to switch the wafer from one stable optical state to that of the other when circuit breaker 56 opens, two specific magnitudes of voltage must be applied; a lower voltage to drive the P.S.C.T. wafer into a scattering state, a higher value of voltage to transform the P.S.C.T. wafer into a reflecting state. The resistors and the diodes 42, 44, 46, 48, reduce the magnitude of the negative going alternation applied to wafer 12 while not interfering with the positive half cycle of the applied voltage in order to achieve texture switching of the wafer. A greater measure of attention can be directed to the display by alternately switching from one state to the other state or colour. This is termed "flashing", and in addition to the two voltage values, it requires a means of switching these voltage values for well defined timed increments which will permit a perceptible visual response. An example of this would be to obtain three flashes of colour differences each second; each display period, or flash, being in the order of 350 milliseconds. A circuit is required to produce an output waveform that is an integral sub-multiple of the power source frequency. A miniature frequency divider 40 can be used for this purpose. A frequency divider is a circuit designed to reduce the source frequency that is to be used for this application, given the current state for P.S.C.T. technology. A suitable frequency divider is a free running multi-vibrator circuit that responds to sub-harmonic triggering.

Figure 6:
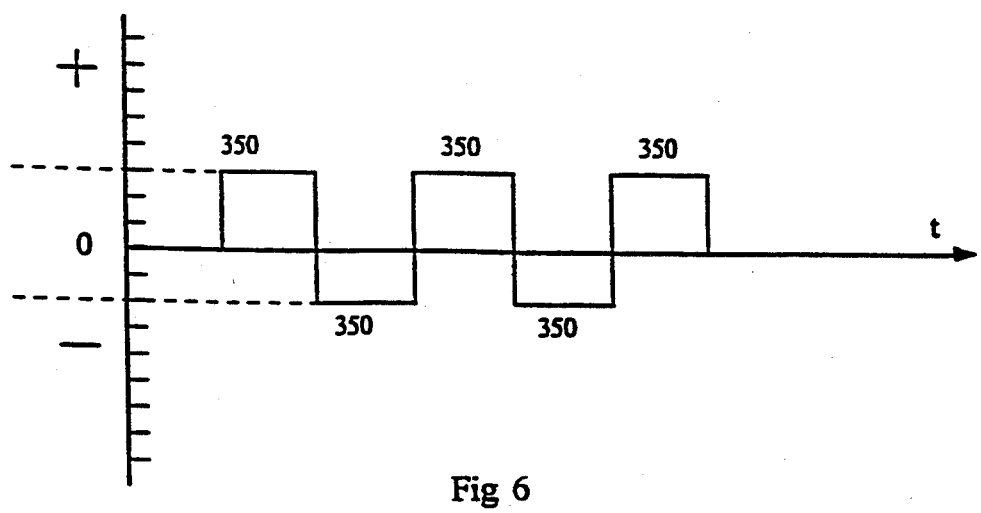
FIG. 6 is a time versus voltage diagram relevant to the operation of the device of FIG. 5.

In the operation of fault indicator 300, as long as the single pole circuit breaker 56 is in its normally closed state, excitation cannot be applied to wafer 12. However, if the breaker opens its contacts, indicating an overload, the 60 Hz source 54, is applied to frequency divider 40 which reduces the 60 Hz frequency. The waveform emerging from the frequency divider is now in the order of 3 Hz with each pulse having a width of on the order of 350 ms. The pulse train is the input to plates 24 and 20 provides field excitation to polymer wafer 12. The result of inserting the frequency divider between terminals 28 and 26 of the 60 Hz power source, and the input to electrodes 22 and 18, is illustrated in FIG. 6, depicting the squared edge rectangular waveform of a reduced frequency. As a result of this, the polymer wafer changes in colour from black to green repetitively. The polymer wafer 12 therefore appears to blink and thus provides a ready indication of the circuit fault.

Figure 7:
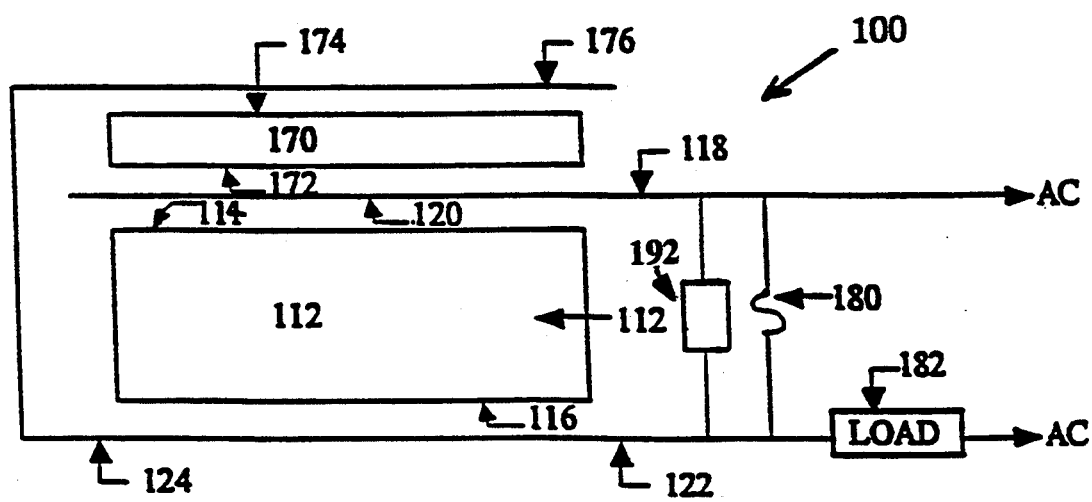
FIG. 7 is a schematic view of another electrical fault indicator made in accordance with another aspect of the present invention which is similar to that shown in FIG. 2, but additionally comprising a frequency divider.

With reference to FIG. 7, the fault indicator described with reference to FIG. 2 is modified and shown am fault indicator 400. Fault indicator 400 is modified by the addition of a frequency divider 192 electrically connected in parallel with normally closed fuse 180. If fuse 180 blows, the AC from the network is divided in frequency by divider 192 before the voltage is applied (as modified by electret wafer 170) across P.S.C.T. wafer 112. By modifying the circuit with the frequency divider 192, the frequency at which visible changes occur in P.S.C.T. wafer 112 may thereby modified.

It is believed that the details of the frequency divider to produce the waveform of FIG. 6 is within the expected skill of those skilled in the art and, therefore, is not further detailed.

Other modifications will be apparent to those skilled in the art and, accordingly, the invention is defined in the claims.

What is claimed is:

1. An electrical fault indicator for an AC circuit, comprising the following:
   a wafer of polymer stabilized cholesteric textures, said wafer having two faces;
   a first conducting electrode having a portion substantially covering one face of said polymer wafer;
   a second conducting electrode having a transparent portion substantially covering the other of said two faces of said polymer wafer;
   terminal means for connecting said first and second electrodes in parallel with a normally closed circuit overload protection device in said AC circuit, so that an AC voltage applied across said overload protection device is applied across said polymer wafer through said terminal means by said first and second electrodes.

2. The fault indicator of claim 1 including means for increasing the magnitude of a pole of said AC voltage applied across said polymer wafer by said first and second electrodes.

3. The fault indicator of claim 2 wherein said voltage increasing means comprises an electret wafer having two faces and being polarised from face-to-face, said portion of said first conducting electrode being sandwiched between said one face of said polymer wafer and one face of said electret wafer and substantially covering said one face of said electret wafer, said second conducting electrode having a further portion substantially covering the other of said two faces of said electret wafer.

4. The fault indicator of claim 2 including a frequency divider interposed between said first and second electrodes and said terminal means to convert input AC to a reduced frequency AC which is applied across said first and said second electrodes, said reduced frequency being a humanly visually perceptible frequency.

5. The fault indicator of claim 3 including a frequency divider interposed between said first and second electrodes and said terminal means to convert input AC to a reduced frequency AC which is applied across said first and said second electrodes, said reduced frequency being a humanly visually perceptible frequency.

6. The fault indicator of claim 1 including means for reducing the magnitude of a pole of said AC voltage applied across said polymer wafer by said first and second electrodes.

7. The electric fault indicator of claim 1 including a protection capacitor in series with one of said first and said second electrodes.

8. The electric fault indicator of claim 1 wherein said portion of said first conducting electrode is transparent and is painted black.

9. The fault indicator of claim 6 wherein said voltage reduction means comprises a resistor and diode network.

* * * * *